(12) United States Patent
Blumenthal (10) Patent No.: US 10,453,365 B2
(45) Date of Patent: Oct. 22, 2019

(54) SYSTEM AND METHOD FOR GROUND-BASED ADVERTISING

(71) Applicant: Benjamin Elias Blumenthal, Dallas, TX (US)

(72) Inventor: Benjamin Elias Blumenthal, Dallas, TX (US)

( * ) Notice: Subject to any disclaimer, the term of this patent is extended or adjusted under 35 U.S.C. 154(b) by 0 days.

(21) Appl. No.: 16/214,820

(22) Filed: Dec. 10, 2018

(65) Prior Publication Data
US 2019/0287440 A1    Sep. 19, 2019

Related U.S. Application Data

(63) Continuation-in-part of application No. 15/922,621, filed on Mar. 15, 2018.

(51) Int. Cl.
*G09F 19/22* (2006.01)
(52) U.S. Cl.
CPC .................. *G09F 19/228* (2013.01)
(58) Field of Classification Search
CPC ............... G09F 19/228; G09F 3/201
See application file for complete search history.

(56) References Cited

U.S. PATENT DOCUMENTS

| | | | | |
|---|---|---|---|---|
| 1,754,851 A * | 4/1930 | Dey | ............... | G09F 13/20 40/653 |
| 2,920,184 A * | 1/1960 | Kessler | ............... | E01F 9/547 362/152 |
| 4,730,146 A * | 3/1988 | Maser | ............... | H05B 33/08 313/511 |
| 4,907,361 A * | 3/1990 | Villard | ............... | G09F 19/22 362/153 |
| 5,772,357 A * | 6/1998 | Evans | ............... | E01F 13/105 256/13.1 |
| 5,848,830 A * | 12/1998 | Castle | ............... | A47G 27/0243 362/84 |
| 6,481,921 B1 * | 11/2002 | Fenimore | ............... | G09F 19/22 404/7 |
| 6,692,182 B1 * | 2/2004 | Fenimore | ............... | E01F 15/083 404/7 |

(Continued)

FOREIGN PATENT DOCUMENTS

WO    WO02/075704 A1    9/2002

OTHER PUBLICATIONS

Spot on Ads webpage, http://www.spotonads.com/products, 2014, 3 pages.

(Continued)

*Primary Examiner* — Gary C Hoge
(74) *Attorney, Agent, or Firm* — Standley Law Group LLP; Jeffrey S. Standley; Adam J. Smith (57) ABSTRACT

An apparatus for ground-based advertising is provided. A back unit includes a floor defining a perimeter, ridges extending from the floor and about the perimeter to define a depression, and a cover configured to be slid into the depression and supported by the back and side ridges. A number of holes are located in the back unit to fasten the back unit to the ground. Another hole is located at the edge of the back unit and cover positioned to be aligned when the cover is installed on the back unit. A cavity is defined by the back unit and the cover into which advertisements and parking space numbers are placed.

20 Claims, 11 Drawing Sheets

(56) References Cited

U.S. PATENT DOCUMENTS

| | | | |
|---|---|---|---|
| 7,351,003 B1* | 4/2008 | Fenimore | E01F 15/085 40/565 |
| 7,845,611 B1* | 12/2010 | Sholander | B42D 9/04 248/441.1 |
| 8,250,795 B2 | 8/2012 | Barbieri et al. | |
| 2003/0099105 A1* | 5/2003 | Watson | F21S 9/037 362/241 |
| 2003/0147694 A1* | 8/2003 | Ryman | G09F 19/22 404/71 |
| 2004/0055483 A1 | 3/2004 | Thollin | |
| 2005/0229451 A1* | 10/2005 | Mullens | G09F 11/02 40/500 |
| 2006/0239775 A1* | 10/2006 | Klassen | G09F 19/22 404/7 |
| 2007/0222633 A1 | 9/2007 | Blum et al. | |
| 2008/0005947 A1 | 1/2008 | Bama et al. | |
| 2009/0282716 A1* | 11/2009 | Barbieri | G09F 7/002 40/606.01 |
| 2010/0153311 A1* | 6/2010 | McCormick | G06Q 99/00 705/500 |
| 2013/0132810 A1* | 5/2013 | Jandt | G09F 13/22 715/209 |
| 2014/0020273 A1 | 1/2014 | DeMarco | |
| 2014/0059902 A1* | 3/2014 | Brown | B42D 5/043 40/497 |
| 2015/0096209 A1 | 4/2015 | Biehl et al. | |
| 2015/0101222 A1* | 4/2015 | Hochfelsen | G09F 7/002 40/541 |
| 2016/0227897 A1* | 8/2016 | Jobling | G09F 3/0291 |
| 2017/0055138 A1* | 2/2017 | McDonnell | H04W 4/021 |
| 2018/0082612 A1* | 3/2018 | McDade | G09F 3/204 |
| 2018/0092482 A1* | 4/2018 | Lock | A47G 25/82 |
| 2018/0108051 A1* | 4/2018 | Rygiel | G06Q 30/0276 |

OTHER PUBLICATIONS

Appellstriping, Youtube Video of Parking lot advertising, https://www.youtube.com/watch?v=tRE4DR5IhhY, Nov. 9, 2018, 2 pages.

* cited by examiner

SYSTEM AND METHOD FOR GROUND-BASED ADVERTISING

CROSS-REFERENCE TO RELATED APPLICATION

This application is a continuation in part of U.S. application Ser. No. 15/922,621 filed Mar. 15, 2018, the contents of which are hereby incorporated by reference as if fully recited herein.

TECHNICAL FIELD

Exemplary embodiments of the present invention relate generally to systems and methods for ground-based advertising.

BACKGROUND AND SUMMARY OF THE INVENTION

One of the most pressing business imperatives today is maximizing the value of a property, be it intellectual, brand-oriented or physical property. Maximizing income is often critical for profitability for a given investment.

Advertising has evolved rapidly with the advent of Internet and mobile devices. In previous generations, advertising was primarily associated with print media, radio, and television, whereas today's advertising executives are constantly looking for ways to reach potential customers via cellular phones, live events (sports, music, etc.), and incessant Internet browsing.

Traditionally, one of the primary ways in companies advertise outside of the digital space is on billboards. These billboards typically reside on the side of a highway or highly trafficked area. The upside to these billboards are that they expose the company's advertisement to many people; however, the quality of exposure is not ideal. A person driving his or her car pays more attention to the cars on the road, the call he or she is on, or the passengers in the car, rather than to the content of the advertisement. Additionally, the driver passes the billboard at a high rate of speed, which makes capturing and reflecting on the advertisement difficult. Finally, given the conditions, most people do not take a photo or somehow capture the data on the advertisement as they drive by, making the billboard advertisements less effective.

An alternative to highway billboard advertising that can reach today's on-the-go consumers is in ground-based environments, such as but not limited to sidewalks, roadways, driveways, patios, bike paths, parking lots, and the like. For example, without limitation, when one parks his or her vehicle in a parking lot, a properly placed advertisement may offer a potential customer a quick look at a nearby product or opportunity, thereby creating a slow intake of the information and an impulse to purchase said product or take advantage of said opportunity. Whereas buses and subways are packed with advertisements, private vehicles generally sport no such advertisements, and are generally difficult to reach. Parking lots offer ideal venues for placing advertisements that drivers will necessarily see as they enter and leave such structures. It is a purpose of the present invention, in some embodiments, to provide systems and methods for providing continuous, changeable advertising on the ground of parking lots and the like.

The present invention is a ground-based advertisement system and method. A plurality of back units may be adapted to be attached to predetermined positions within a parking lot having parking spaces. A plurality of clear covers may be adapted to be placed over each of the back units. The back units and the covers may define substantially sealed cavities adapted to hold one or more advertisements. The advertisements may be adapted to fit within the cavities. The advertisements may include a code, such as but not limited to a QR code, which upon being scanned may retrieve a coupon or further information for use at a nearby retailer. Alternatively, or in addition, the advertisements may include instructions to take a photo of the advertisement and bring it into a nearby retailer for a discount.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1A:
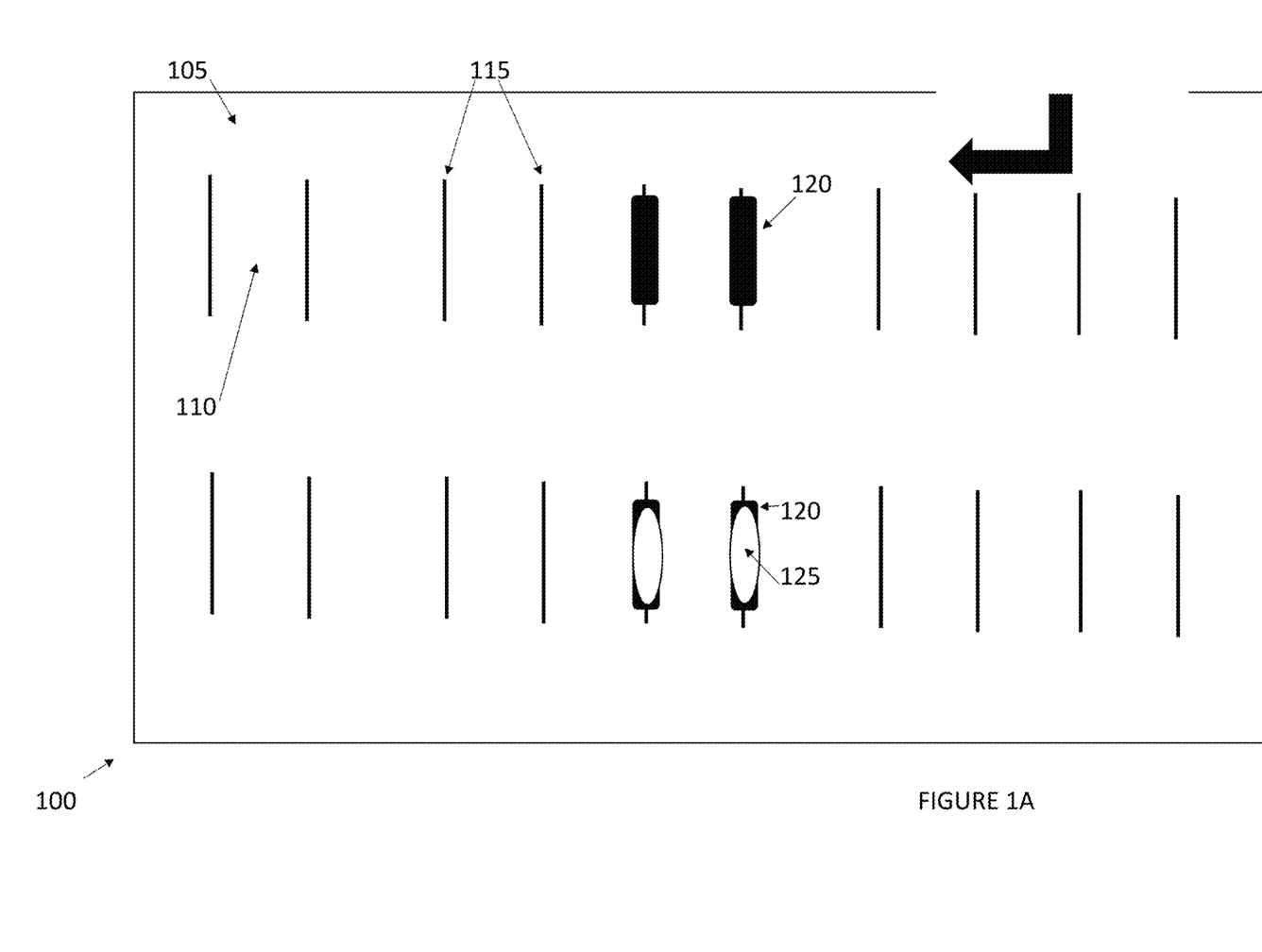
FIG. 1A is top view of an exemplary parking lot advertising system.

FIG. 1A is a top view of an exemplary parking lot advertising system 100. The parking lot advertising system 100 may include a parking lot 105 divided into a plurality of parking spaces 110. Each parking space 110 may be defined by one or more dividers 115. The dividers 115 may generally be realized as white or yellow painted lines or alternatively a raised cement structure. Any kind of divider 115 is contemplated. On such dividers 115, or in their place, back units 120 may be fixed to the surface of the parking lot 105. Fixing of the back units 120 may be accomplished by any means, including but not limited to, bolting, screwing, nailing, fastening, gluing, adhering, attaching, fixing, bonding, immobilizing, some combination thereof, or the like. It is contemplated that the back units 120 may be placed in any pattern or randomly throughout the parking lot 105. In exemplary embodiments, the back units 120 may be spaced such that a vehicle can fit between the back units 120, though such is not required. For example, without limitation, while the back units 120 are illustrated as being located on the dividers 115, it is contemplated that the back units 120 may be placed at the head or foot of a parking space 110.

The covers 125 may be attached to the back units 120. The covers 125 may be comprised of a polymer. The covers 125 may be transparent or translucent. The covers 125 may be waterproof. The back units 120 may be adapted to withstand the weight of a car, truck, bus, or other vehicle either moving over or resting on said back units 120 without cracking, breaking, fracturing, shattering, or undergoing inelastic deformation. Similarly, the covers 125 may be adapted to withstand the weight of a car, truck, bus, or other vehicle either moving over or resting on said covers 125 without cracking, breaking, fracturing, shattering, or undergoing inelastic deformation. The covers 125 may be fastened, attached, joined, combined or otherwise associated transiently or permanently with the back units 120. A hinge may be used to join the back unit 120 and the cover 125. The space between the back unit 120 and the cover 125 may define a cavity adapted to receive advertisements.

In other exemplary embodiments, a portion of the ground, structure surface, or the like may be excavated to form an excavated area for the advertising unit 140. In such embodiments, the excavated area may be sized such that the top surface of the advertising unit 140 is substantially flush with the ground or surface of the structure.

Figure 1B:
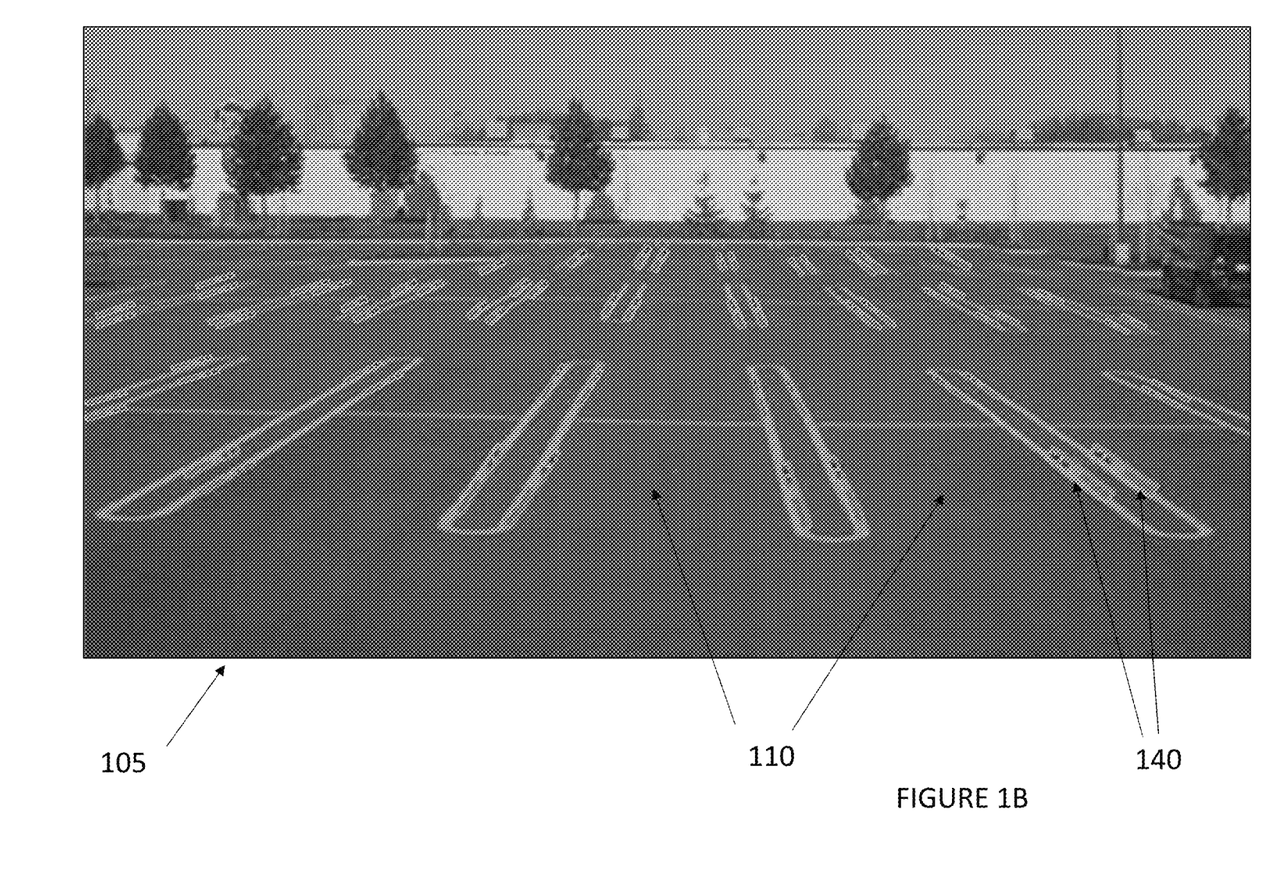
FIG. 1B is a perspective view of another exemplary parking lot advertising system.

FIG. 1B is a perspective view of another exemplary parking lot advertising system. The parking lot 105 may comprise a number of the advertising units 140 placed on the surface of the parking lot 105 around the parking spaces 110. The advertising units 140 may be placed so as to not interfere with facile parking in the parking spaces 110. The advertising units 140 may be adapted to withstand passing and standing vehicles without damage or inelastic deformation. The advertising units 140 may be made from, or contain advertisement made from, reflective or luminescent material that allows the advertisement to glow at nighttime when temporarily exposed to any lighting source. The advertising units 140 may be further configured in size and shape to reduce the risk of tripping over said units.

Figure 2A:
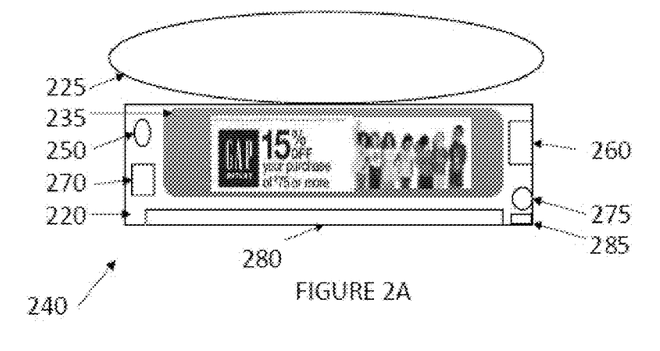
FIG. 2A is a top view of an exemplary advertising unit for use with the systems of FIGS. 1A and 1B.
Figures 2B, 2D:
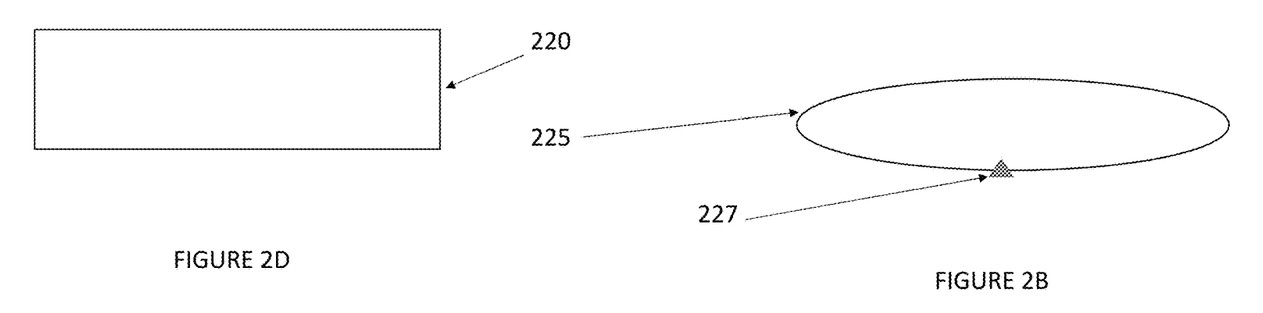
FIG. 2B is a top view of an exemplary cover for the advertising units of FIG. 2A.
FIG. 2D is a top view of an exemplary a back unit for the advertising units of FIG. 2A.

Attention is turned to FIG. 2A though FIG. 2D which illustrate an exemplary advertising unit 240. A back unit 220 may be attached to the ground, a parking lot 105, or another structure by any means, including but not limited to a fastener, adhesive, bonding technique, or the like. The fastener, adhesive, bonding technique may be configured to maintain a cavity. A cover 225 may be adapted to be placed over the back unit 220. A hinge 227 may connect the cover 225 to the back unit 220 to allow for facile opening and closing of the cover 225 to replace advertisements 235 or otherwise service the advertising unit 240. The back unit 220 and the cover 225 together form the cavity adapted to receive one or more advertisements 235. In exemplary embodiments, the cavity may be substantially sealed. Stated another way, the back unit 220 and the cover 225 may form a substantially sealed engagement such that the cavity is substantially sealed, though such is not required. Regardless, the cavity may form a secure compartment for protecting deposited advertisements 235. The cavity may be configured to withstand severe and extreme weather conditions such as, but not limited to, rain, storms, lightning, wind, hail, snow, freezing conditions, sub-zero temperatures, high temperatures, direct sunlight, tornadoes, earthquakes, flooding, hurricanes, tsunamis, some combination thereof, or the like.

The back unit 220, the cover 225, and other components of the advertising unit 240 may be comprised of a material adapted to withstand the weight of a standing or moving vehicle without being crushed, cracked, fractured, shattered, or otherwise inelastically deformed. In this way, the advertisement 235 may remain protected within the cavity. Alternatively, or in addition, the back unit 220, the cover 225, and other components of the advertising unit 240 may be configured to resist shear forces. Such shear forces may be experienced as a result of a vehicle moving laterally over the advertising unit 240.

Closing the cover 225 over the back unit 220 with the advertisement 235 in the cavity may constitute a complete advertising unit 240. The back unit 220 may be comprised of any material such as, but not limited to, a metal, rubber, polymer, or the like. The cover 225 may be comprised of any material such as, but not limited to, a polymer.

Figure 2C:
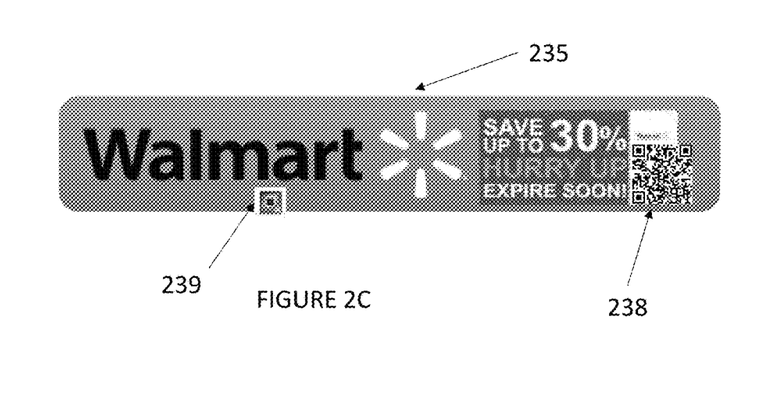
FIG. 2C is a top view of an exemplary advertisement for use the advertising units of FIG. 2A.

It is understood that the advertisement 235 may be comprised of any material including but not limited to paper, polymers, metal, and the like. In exemplary embodiments, the advertisement 235 may be printed on a material capable of phosphorescing. The advertisement 235 may comprise colors or be presented in black and white. The advertisements 235 may be laminated. The advertisement 235 may depict a plurality of advertisements based on optical perspective or may contain a number of advertising images for different retailers. Advertisements 235 may include codes 238, such as but not limited to barcode, QR code, or the like, which may permit a consumer to obtain additional information or discounts for use at a nearby retailer. Alternatively, or additionally, the advertisement 235 may comprise one or more RFID chips 239. The RFID chips 239 may be configured to permit for near range tracking or communication between advertisement 235 and a nearby mobile electronic device.

The cover 225 may be mounted to the back unit 220. In exemplary embodiments, the cover 225 may be mounted to the back unit 220 in a hinged fashion. A polymer-based color advertisement 235 may be placed between the back unit 220 and the cover 225. The advertising unit 240 may further comprise one or more solar energy devices 250 adapted to convert sunlight into energy. The solar energy devices 250 may comprise, for example without limitation, solar panels, photovoltaic cells, and the like. The advertising unit 240 may further comprise a battery 260 in electrical connection with the solar energy device 250. The advertising unit 240 may further comprise one or more illumination devices 280. The illumination devices 280 may be in electrical connection with one or more of the battery 260 and the solar energy device 250. The illumination devices 280 may comprise, without limitation incandescent lights, fluorescent lights, LED lights, some combination thereof, or the like. The illumination devices 280 may be positioned at various location(s) on the back unit 220. The solar energy device 250 and the battery 260 may be adapted to provide electricity to the illumination devices 280 when a sensor 275 identifies low light conditions. While solar energy device 250 are described, alternatively or additionally, a connection to the electrical grid may supply power to the advertising unit 240. Such connection may be wired or wireless.

The advertising unit may further comprise a camera 270 and associated executable software instructions. The camera 270 may be adapted to identify vehicles located in close proximity with the advertising unit 240. The camera 270 may comprise a computing device 285, which may comprise an electronic storage device, a processor, and the like. The executable software instructions may be stored on the electronic storage device and may configure the processor to perform the steps and features shown and described herein.

Figure 2E:
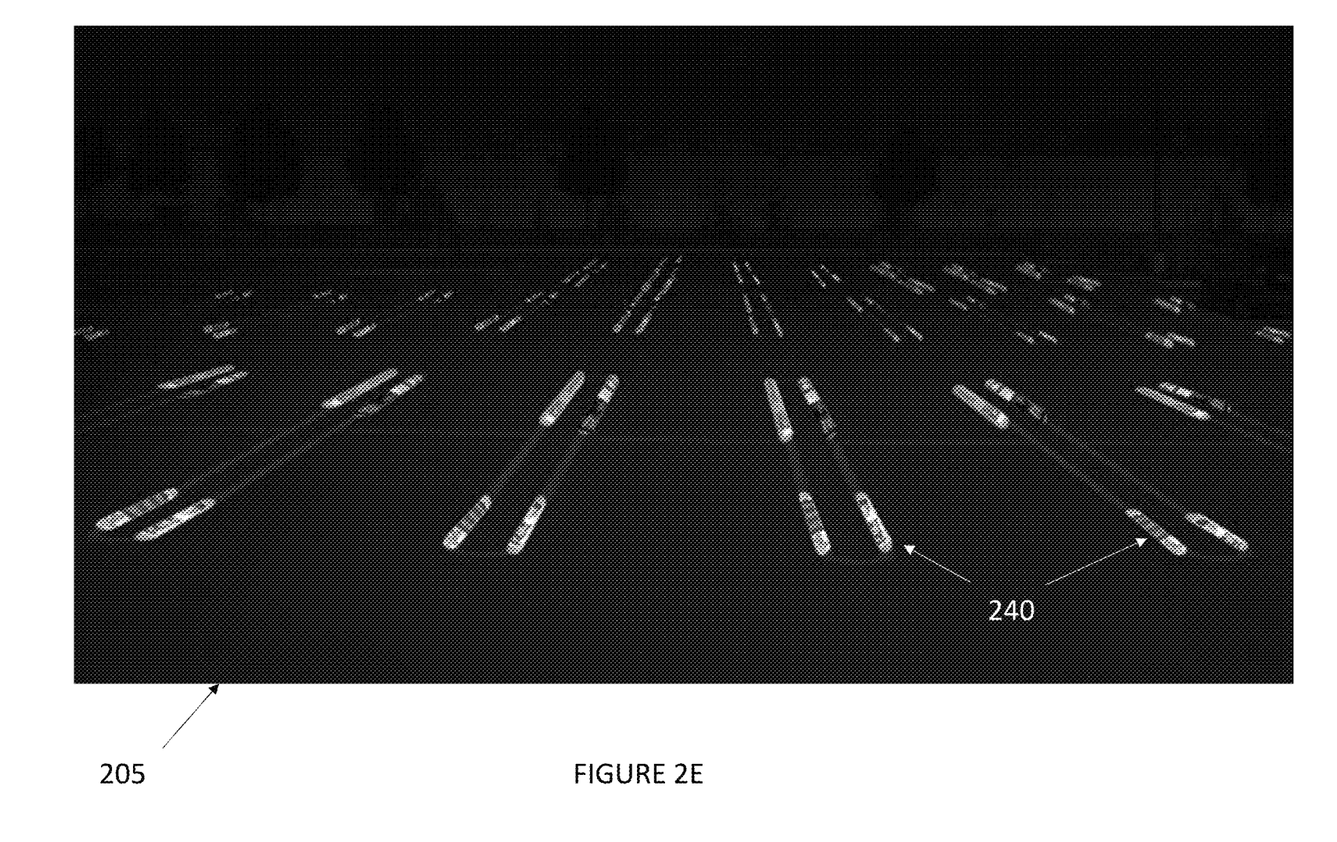
FIG. 2E shows a night view of a parking lot with a plurality of the advertising units of FIG. 2A.

As shown in FIG. 2E, a parking lot 205 may comprise a plurality of advertising units 240 which may be illuminated by the illumination devices 280 by the electrical energy stored it associated batteries 260. Electrical energy may be generated by either grid power or associated solar energy device 250. The light sensors 275 may identify appropriate timing or lighting conditions for activating the illumination devices 280. Alternatively, the timing and lighting controls may be preprogrammed.

Figure 3:
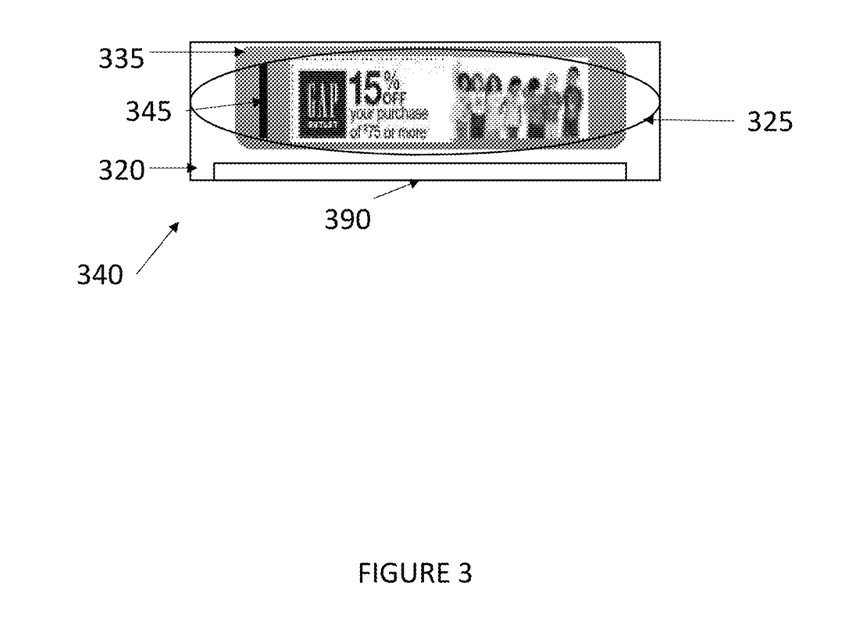
FIG. 3 is a top view of another exemplary advertising unit for use with the systems of FIGS. 1A and 1B.

FIG. 3 illustrates another exemplary advertising unit 340. The advertising unit 340 may additionally comprise a phosphorescent or similar material 390. The material 390 may be configured to illuminate the advertisement 335 deposited within the cavity for a portion of the nighttime. The material 390 may be used in addition to, or in substitution of, the illumination devices 280. The material 390 may be deposited in one, or multiple, locations of the advertising unit 340. The material 390 may comprise, for example, without limitation, a zinc sulfide, strontium aluminate, calcium sulfide, or phosphorescent pigment.

In some exemplary embodiments, the cover 325 may be permanently attached to the back unit 320 to define the cavity for the advertisement 335 or advertisements 335. A slot 345 may be positioned on the cover 325. The slot 345 may be configured to permit the insertion and removal of advertisement 335 as per timing and business arrangement with clients. The slot 345 may comprise a slot cover operable between a closed and an opened position. When the slot cover is in the closed position, in exemplary embodiments without limitation, the cavity may remain substantially sealed.

Figure 4:
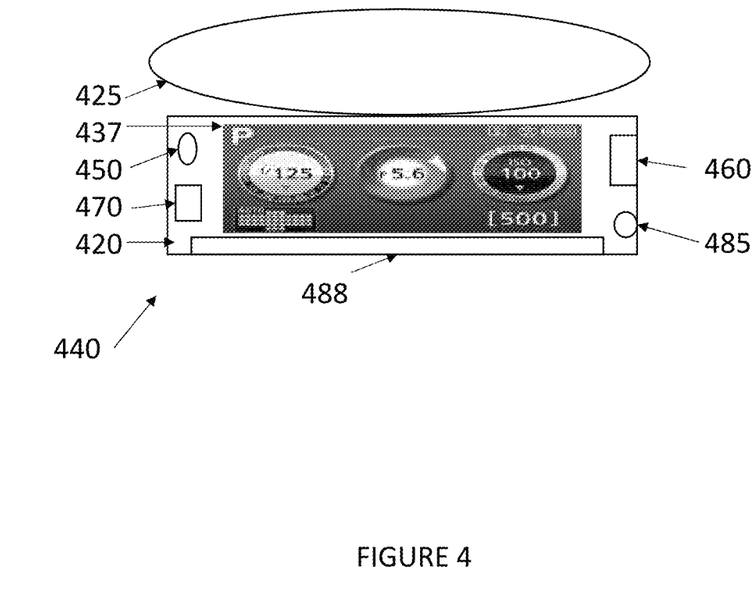
FIG. 4 is a top view of another exemplary advertising unit for use with the systems of FIGS. 1A and 1B.

Attention is turned to FIG. 4 illustrating another exemplary advertising unit 440. The advertising unit 440 may comprise a back unit 420 and a cover 425. The back unit 420 may be configured to be attached to the ground or another surface or structure. For example, without limitation, the back unit 420 may be attached by screws, nails, metal plates, some combination thereof, or the like. The cover 425 may be attached to the back unit 420 in a hinged fashion. The space between the cover 425 and the back unit 420 may define a cavity. An electronic display 437 may be located within the cavity. The electronic display 437 may be adapted to withstand the weight of a vehicle.

The advertising unit 440 may further, alternatively or additionally, comprise a photovoltaic cell 450. The photovoltaic cell 450 may be electrically connected to the electronic display 437. A battery 460 may be electrically connected to the photovoltaic cell 450. The battery 460 may also be electrically connected to the electronic display 437. The photovoltaic cell 450 and the battery 460 may be adapted to supply power to the electronic display 437 such that the electronic display 437 may display images, such as but not limited to, advertising, notifications, or other content.

The images may be delivered to the advertising unit 440 by way of a network connection device 485. The network connection device 485 may be connected to a network, such as but not limited to, a cellular network, the internet, an intranet, the world wide web, or the like. The network device may be powered by a wired electrical connection (not shown) or a wireless electrical connection (not shown). The network connection device 485 may be connected to the network by way of a wired or wireless connection. The advertising unit 440 may further comprise a controller 488. The controller 488 may be a server, database, or the like. The controller 488 may be in electronic communication with the electronic display 437 and the network connection device 485. The controller 488 may comprise executable software instructions, which when executed, configure the control 488 to receive and store advertising content received at the network connection device 485. The software may further configure the controller 488 to direct the electronic display 437 to display particular images. The controller 488 may be configured to select, for example without limitation, the images displayed, the timing of advertisements, and the order of multiple advertisements. For example, without limitation, the controller 488 may be configured to change the displayed image after a predetermined period of time, such as but not limited to, 15 minutes, 30 minutes, 1 hour, 2 hours, 10 hours, 24 hours, one week, two weeks, or one month. Any interval of time is contemplated.

The advertising unit 440 may further comprise a camera 470. The camera 470 may be adapted to identify vehicles located in close proximity to the advertising unit 440. In other exemplary embodiments, the camera 470 may transfer data to the controller 488 which makes such determinations. The controller 488 may be configured to select the images to be displayed on the electronic display 437 based upon the specific car make and model as identified by the camera 470 or the controller 488.

The controller 488 may be located within the cavity. In other exemplary embodiments, the controller 488 is located remote from the advertising unit 440 and is in wireless or wired communication with the advertising unit 440. In still other exemplary embodiments, a single controller 488 may be in communication with multiple advertising units 440. The controller 488 may likewise be in communication with multiple advertising units 440 across multiple parking lots 105.

Figure 5:
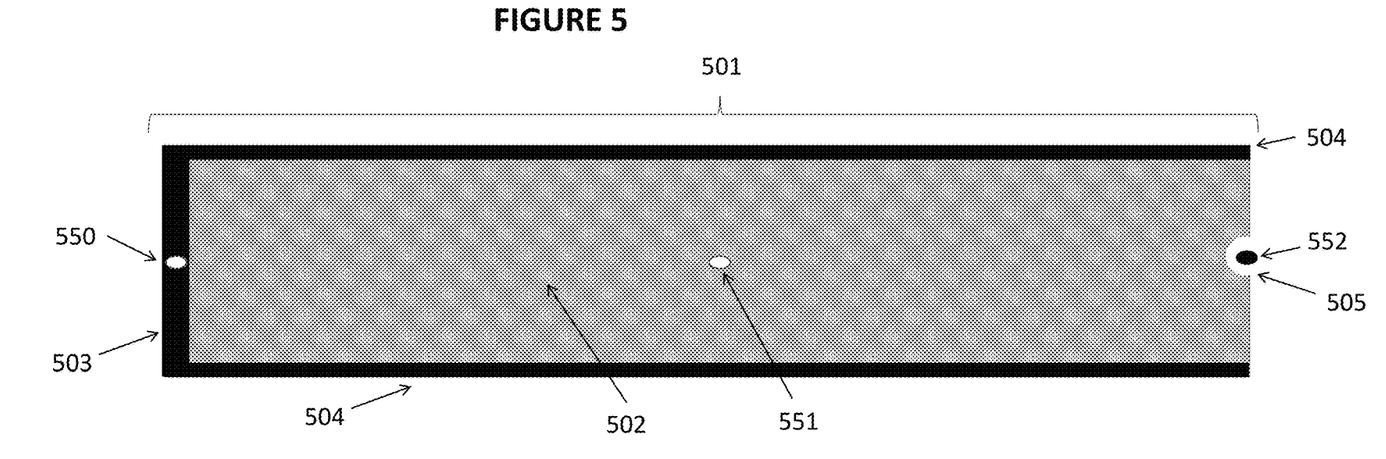
FIG. 5 is a top view of an exemplary back unit of another exemplary advertising unit for use with the systems of FIGS. 1A and 1B.

Attention is turned to FIG. 5 which illustrates another exemplary back unit 501. The back unit 501 may comprise a base 502, a back ridge 503, and one or more side ridges 504. The back ridge 503 may be located along a left side edge of the base 502. The side ridges 504 may extend along the front and rear edges of the base 502. The side ridges 504 and the back ridge 503 may be of similar size such that they may accept a cover in a sliding fashion such that the cover is elevated above the base 502. The space between the cover and the base 502 may define a cavity for accepting one or more advertisements.

The back unit 501 may also comprise a base notch 505 which is configured to accept a front grounding screw 552. The base notch 505 may be semi-circular in shape and may be located along a right side edge of the base 502, though any location is contemplated. In one exemplary embodiment, the back unit 501 further comprises a rear grounding hole 550 and a center grounding hole 551. The rear grounding hole 550 may be located along a left side edge of the base 502 and the center grounding hold 551 may be located in approximately the center of the base 502. The back unit 501 may be attached to the ground via screws inserted through the rear grounding hole 550 and the center grounding hole 551 in addition, or alternatively, to insertion of the front grounding screw 552 in the base notch 505.

The back unit 501 may be substantially rectangular in shape, though any shape is contemplated. The base 502 may be substantially rectangular or oval in shape, though any shape is contemplated.

Figure 6:
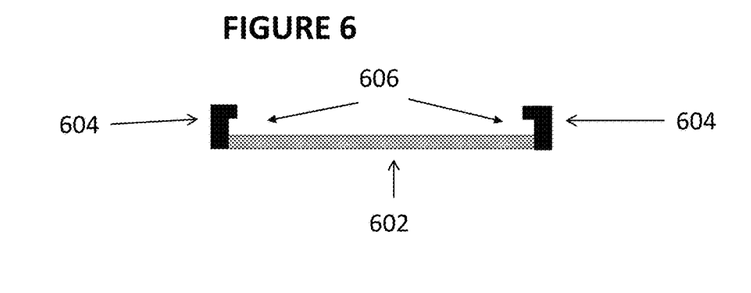
FIG. 6 is a side view top of another exemplary back unit.

Attention is turned to FIG. 6 illustrates a side view of another exemplary back unit. A base 602 and one or more side ridges 604 may form a slide track 606 into which a cover may be easily inserted in a sliding fashion. In exemplary embodiments, the side ridges 504 of FIG. 5 may be similar to the side ridges 604 of FIG. 6.

Figure 7:
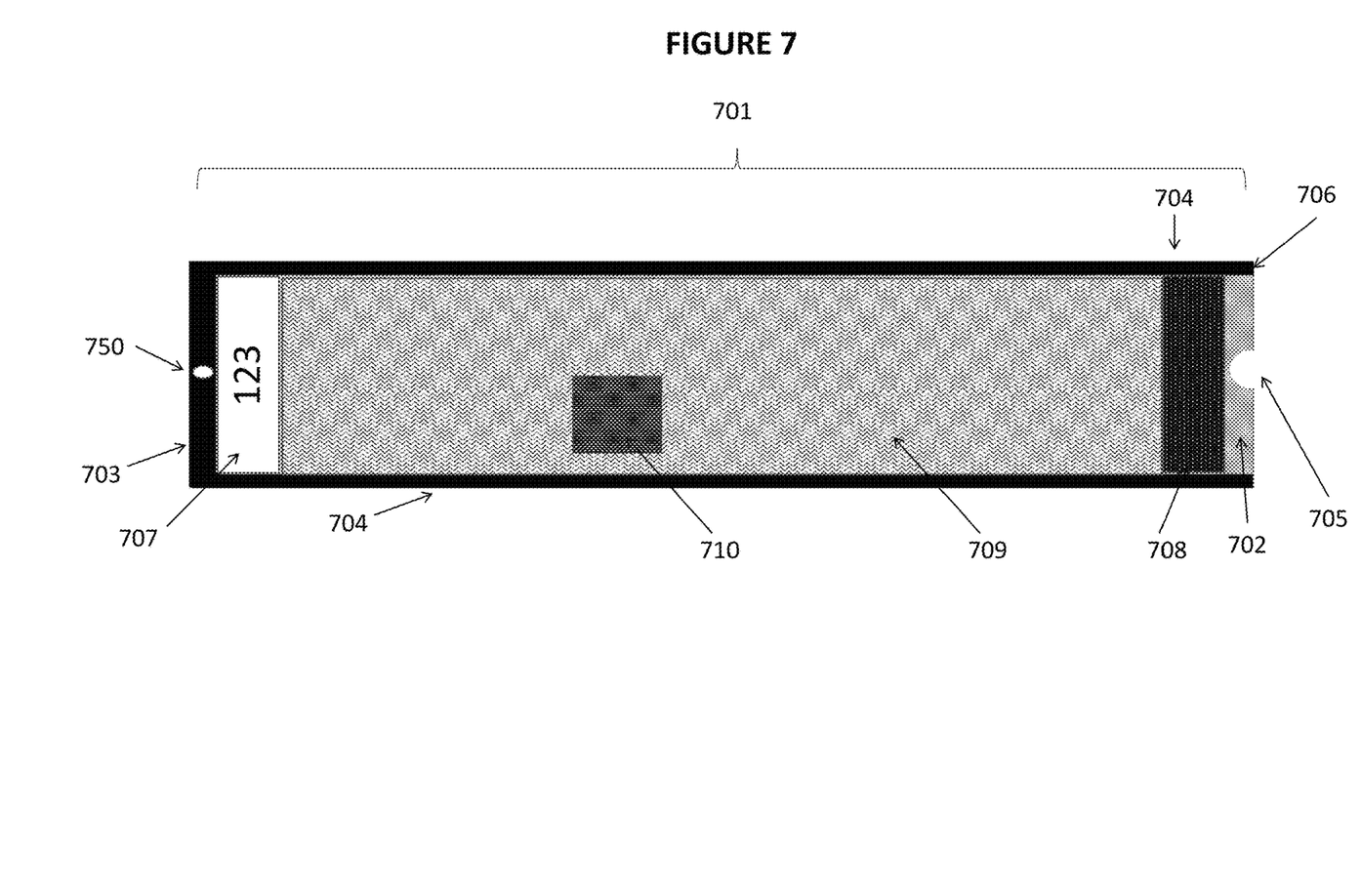
FIG. 7 is a top view top of another exemplary back unit.

Attention is turned to FIG. 7 which illustrates another exemplary back unit 701. The parameters of the base 702 may be defined by a back ridge 703 and one or more side ridges 704. The back ridge 703 and the side ridges 704 may together form a cover slide track 706. A place within the base 702 may be designated for ad space used for optional parking space numbering 707. Additionally, another space may be dedicated as ad space for other smaller advertisements 708. The remainder of the space is the primary advertising space 709. The advertisement placed in the primary advertising space 709 may comprise a QR code 710 or other promotional codes.

Figure 8:
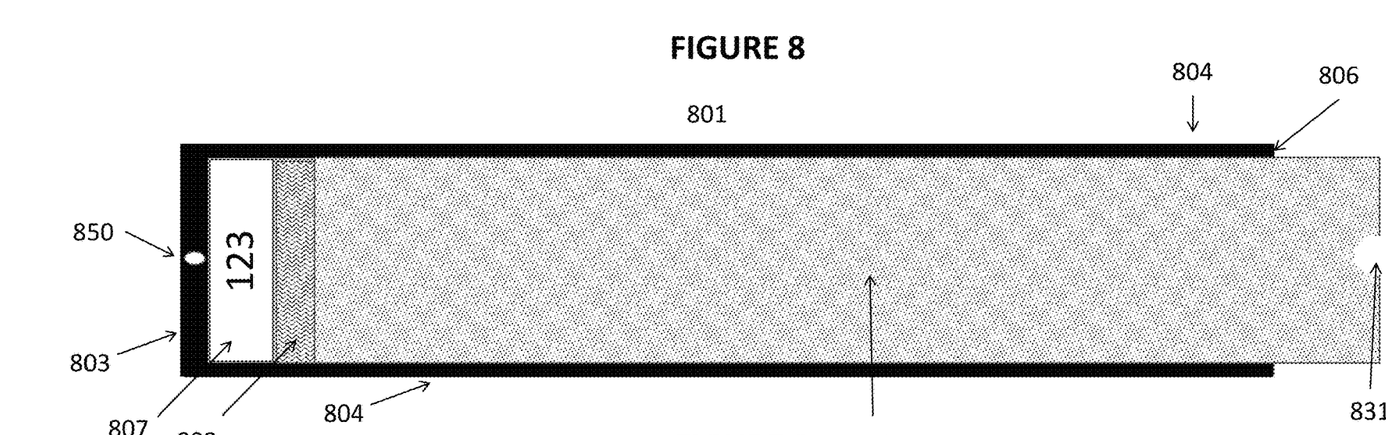
FIG. 8 is a top view of another exemplary advertising unit of FIG. 7 with the cover partially inserted.

Attention is turned to FIG. 8 which illustrates another exemplary back unit 801 with a cover 830 shown partially inserted into track 806. The track 806 may be defined by a back ridge 803, and one or more side ridges 804. In the illustrated embodiment, the cover 830 is shown as non-transparent so as to highlight the method of installation of the cover 830. Attention is drawn to the cover notch 831 which may be identical in size and shape to base notch 705 from FIG. 7. The cover 830 may be comprised of a transparent or translucent material. The cover 830 may be comprise of any material, such as but not limited to a polymer.

Figure 9:
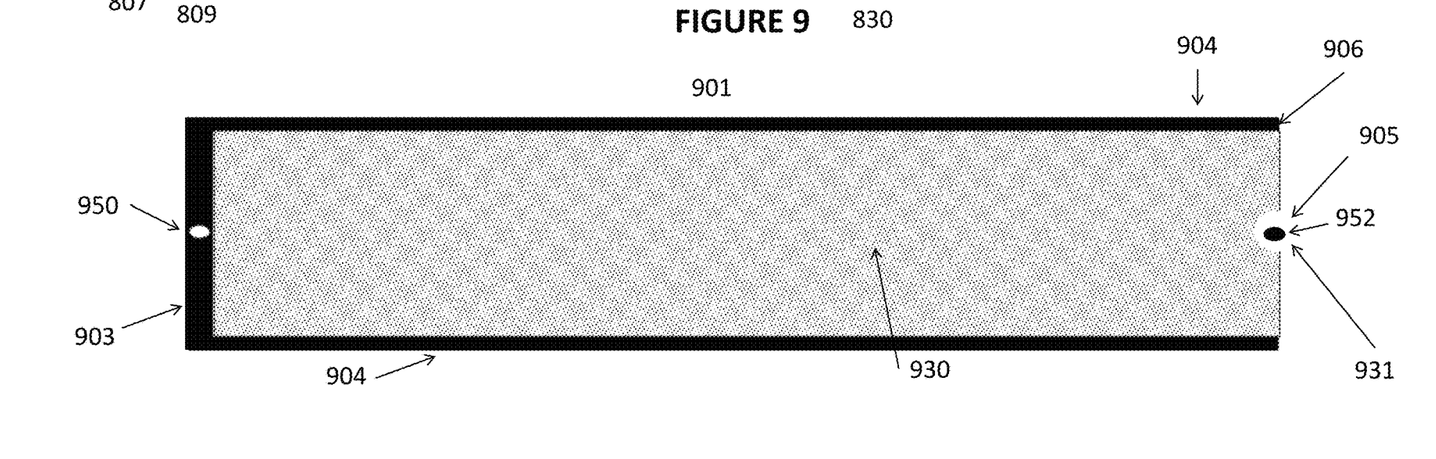
FIG. 9 is a top view of another exemplary advertising unit of FIG. 7 with the cover fully inserted and shown as non-transparent for purposes of demonstrating the method of insertion.

Attention is turned to FIG. 9 which illustrates another exemplary back unit 901 with a cover 930 shown fully inserted into a track 906. The track 906 may be defined by a back ridge 903, and one or more side ridges 904. In the illustrated embodiment, the cover 930 is shown as non-transparent so as to highlight the method of installation. Attention is drawn to the alignment of base notch 905 and cover notch 931, which may create a space into which the front grounding screw 952 is inserted. This arrangement may inhibit the tampering or removal of the cover and restricting access to the advertisements contained within the advertising unit.

Figure 10:
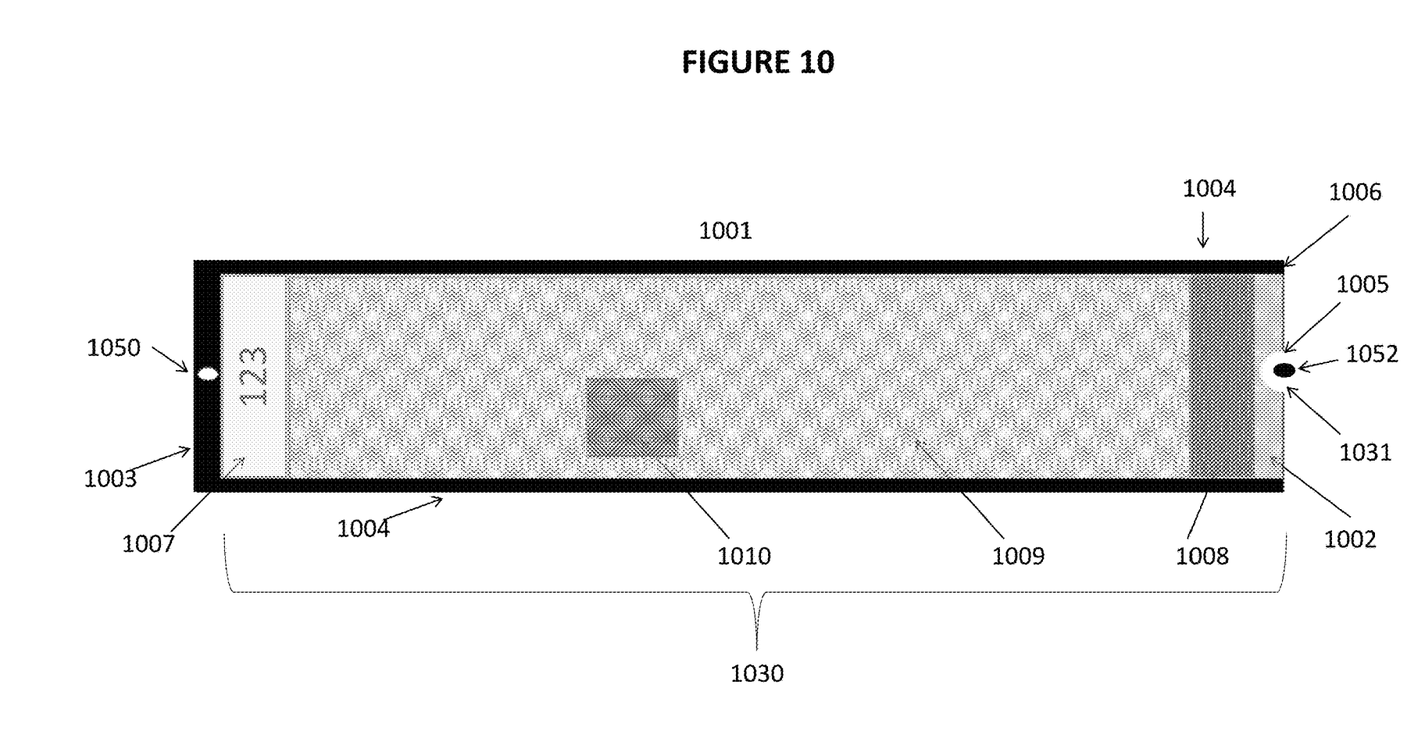
FIG. 10 is a top view of another exemplary advertising unit of FIG. 7 with the cover fully inserted and shown as transparent.

Attention is turned to FIG. 10 which illustrates another exemplary back unit 1001 with a cover 1030 shown fully inserted into track 1006. The tack 1006 may be defined by back ridge 1003, side ridges 1004, and the base 1002. In this figure, the cover 1030 is shown as transparent so as reveal the underlying primary advertising space 1009, the smaller advertising space 1008, and optional parking lot numbering space 1007. Attention is drawn to the alignment of base notch 1005 and cover notch 1031, which may create a space into which the front grounding screw 1052 is inserted.

Figure 11:
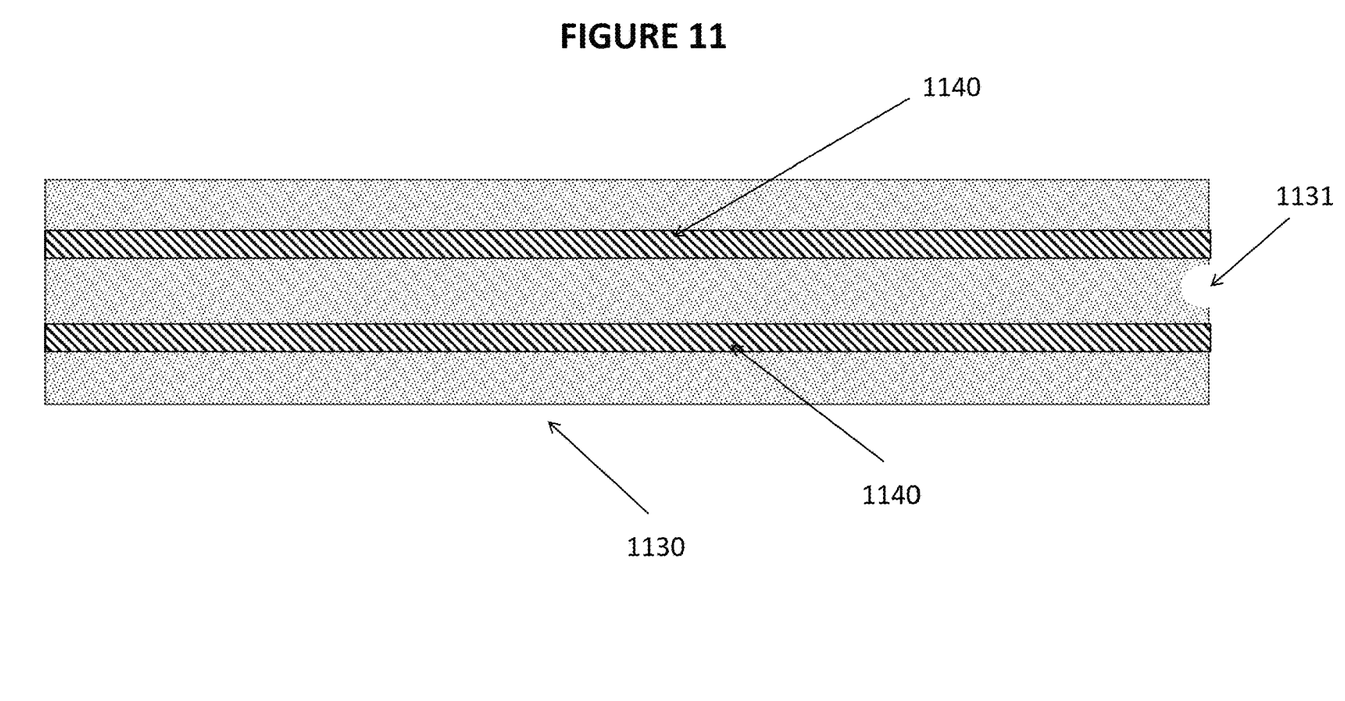
FIG. 11 is a top view of an exemplary a cover, shown in isolation in order to illustrate additional features thereof.

Attention is turned to FIG. 11 which illustrates a cover 1130 with a cover notch 1131 and traction strips 1140 to minimize slips and falls as pedestrians walk over the units. The traction strips 1140 may be comprised of a material having a high coefficient of friction. The traction strips 1140 may be configured to help prevent individuals from slipping when walking over the cover 1130. Any number, size, shape, location, and orientation of the traction strips 1140 is contemplated. For example, without limitation, the traction strips 1140 may comprise a textured surface, be comprised of a tacky material, some combination thereof, of the like.

The advertising units shown and described herein may be installed near a parking space 110, though such is not required. In exemplary embodiments, the advertising unit is installed between adjacent parking spaces 110. The advertising unit may be installed along one or more parking space boundaries 115. The boundaries 115 may comprise pained lines, curbs, dividers, or the like. However, any location of the advertising unit is contemplated.

The advertising units shown and described herein may be sized and configured to have a low profile. In particular, the advertising units may be sized and configured to reduce the chance of tripping over the advertising unit. More specifically, the high of the advertising unit may be configured to extend less than ¼ inch above the surface of the ground, parking lot, or other structure. This may be accomplished by modifying the height of the advertising unit and its various components and/or mounting the advertising unit in a partially or wholly recessed fashion. In particular, the advertising unit may be installed to be flush with the surface of the ground, parking lot, or other structure.

Various components of the advertising units shown and described herein, including but not limited to the back units, the covers, and the like, may be configured to withstand the weight of a vehicle without breaking, cracking, fracturing, shattering, or otherwise inelastically deforming. Alternatively, or in addition, various components of the advertising unit, including but not limited to the back unit, the cover, and the like may be configured to withstand shear forces created by a vehicle contacting the advertising unit or various component thereof without breaking, cracking, fracturing, shattering, or otherwise inelastically deforming.

The fasteners shown and described herein may be of any type. For example, the fasteners may be screws, anchors, nails, bolts, some combination thereof, or the like. The fasteners may comprise one or more tamper-resistant features such as a unique head design. In exemplary embodiments, an adhesive may be used as an alternative to, or with, one or more of the fasteners. The fasteners may additionally or alternatively, be used in conjunction with one or more anchors. For example, without limitation, a hole may be drilled and glue may be inserted. An anchor may be inserted into the hole. The anchor may be configured to mate with a corresponding fastener. The fasteners may then be inserted through one or more components of the advertising unit and be made to mate with the anchor.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An apparatus for ground-based advertising comprising:
  a back unit comprising:
    a base;
    a back ridge attached to the base;
    two side ridges attached to the base; and
    a back unit notch located at an open edge of the back unit;
  a cover comprising a cover notch located at an edge of the cover;
  a track defined by the back ridge and two side ridges, wherein the track is configured to support the cover in an elevated position; and
  a number of holes located in back unit.

2. The apparatus of claim 1 wherein:
  the track is configured to receive the cover in a sliding arrangement.

3. The apparatus of claim 1 wherein:
  the back unit notch is configured to align with the cover notch such that a grounding faster may be inserted.

4. The apparatus of claim 1 wherein:
  the back unit and the cover are configured to withstand the weight of a vehicle without fracturing or experiencing inelastic deformation.

5. The apparatus of claim 1 further comprising:
  a cavity defined by the back and side ridges and the cover; and
  a plurality of advertisements configured to be received within the cavity.

6. The apparatus of claim 5 wherein:
  at least one of said advertisements is laminated and comprises a QR code or a promotional code.

7. The apparatus of claim 1 wherein:
  the number of holes are threaded holes, each configured to receive a fastener for securing the back unit to a parking lot.

8. The apparatus of claim 1 wherein:
  the back unit is configured to be secured along dividing lines between adjacent parking spaces in the parking lot.

9. An apparatus for ground-based advertising comprising:
  a transparent or translucent cover;
  a back unit having a substantially rectangular shape and comprising:
    a base;
    a back ridge attached to the base;
    two side ridges attached to the base; and
    a track defined by the back ridge and two side ridges and configured to receive and support the cover in an elevated position above the base;
  a number of holes located in back unit;
  a notch located at an open edge of the back unit;
  a notch located at an edge of the cover;
  one or more traction strips placed on the cover;
  a cavity defined by the cover and the track; and
  at least one aperture located in the base and sized to receive a fastener for securing the back unit to a surface.

10. The apparatus of claim 9 wherein:
  the back unit is configured to be secured to the surface; and
  the surface is a parking lot.

11. The apparatus of claim 9 further comprising:
  a plurality of advertisements configured to be placed within the cavity.

12. The apparatus of claim 11 wherein:
  the advertisement comprises a scannable code for a nearby retailer.

13. The apparatus of claim 9 wherein:
  the cover is adapted to withstand the weight of a vehicle without fracturing or experiencing inelastic deformation.

14. The apparatus of claim 9 wherein:
  the back unit is adapted to withstand the weight of a vehicle without fracturing or experiencing inelastic deformation.

15. The apparatus of claim 11 wherein:
  the advertisement is adapted to withstand the weight of a vehicle without fracturing or experiencing inelastic deformation.

16. The apparatus of claim 9 wherein:
  the back unit is configured to be secured to the surface; and
  the surface is a curbside.

17. The apparatus of claim 9 wherein:
  the one or more traction strips comprise adhesive tape; and
  said one or more traction strips are sized to cover substantially the entire cover.

18. A system for ground-based advertising comprising:
  a back unit comprising:
    a base having a substantially rectangular shape;
    a track located at an elevated position relative to the base and extending along two opposing sides of a floor; and
    at least one aperture located in the base and configured to receive a fastener;
  a cover configured to engage the track in a sliding arrangement, wherein said cover is comprised of a substantially transparent material and comprises at least one strip comprised of a material having a high coefficient of friction; and
  a cavity defined by the space between the cover and the floor, wherein the cavity is configured to receive at least one advertisement and a parking lot numbering system.

19. The system of claim 18 wherein:
  the at least one aperture is positioned such that placement of the fastener in the at least one aperture prevents sliding movement of the cover.

20. The system of claim 18 wherein:
  the cover and the back unit is adapted to withstand the weight of a vehicle without fracturing or experiencing inelastic deformation.

* * * * *

UNITED STATES PATENT AND TRADEMARK OFFICE
CERTIFICATE OF CORRECTION

PATENT NO.         : 10,453,365 B2                                   Page 1 of 1
APPLICATION NO.    : 16/214820
DATED              : October 22, 2019
INVENTOR(S)        : Benjamin Elias Blumenthal It is certified that error appears in the above-identified patent and that said Letters Patent is hereby corrected as shown below:

On the Title Page

Page 2, item (56) References Cited, U.S. Patent Documents, please delete "Bama et al." and insert
-- Barna et al. --.

Signed and Sealed this
Twenty-sixth Day of May, 2020

Andrei Iancu
*Director of the United States Patent and Trademark Office*